United States Patent
Rivierre et al.

(10) Patent No.: US 7,539,743 B2
(45) Date of Patent: May 26, 2009

(54) METHOD AND SYSTEM OF ADMINISTRATION IN A JMX ENVIRONMENT COMPRISING AN ADMINISTRATION APPLICATION AND SOFTWARE SYSTEMS TO BE ADMINISTERED

(75) Inventors: Nicolas Rivierre, Paris (FR); Thierry Coupaye, Crolles (FR); François Horn, Brunoy (FR)

(73) Assignee: France Telecom, Paris (FR)

( * ) Notice: Subject to any disclaimer, the term of this patent is extended or adjusted under 35 U.S.C. 154(b) by 600 days.

(21) Appl. No.: 11/339,291

(22) Filed: Jan. 25, 2006

(65) Prior Publication Data
US 2006/0184662 A1    Aug. 17, 2006

(30) Foreign Application Priority Data
Jan. 25, 2005    (FR)    ................... 05 00764

(51) Int. Cl.
G06F 15/16    (2006.01)
(52) U.S. Cl. ..................... 709/223; 717/164
(58) Field of Classification Search ......... 709/200–203, 709/217–227; 717/100–104, 164
See application file for complete search history.

(56) References Cited

U.S. PATENT DOCUMENTS

| 6,061,721 | A | 5/2000 | Ismael et al. ................. 709/223 |
| 6,795,791 | B2* | 9/2004 | Gorman ....................... 702/124 |
| 7,356,562 | B2* | 4/2008 | Yoon ........................... 709/203 |
| 2004/0019669 | A1 | 1/2004 | Viswanath et al. ........... 709/223 |
| 2004/0230973 | A1* | 11/2004 | Cundiff et al. ................. 718/1 |
| 2005/0092825 | A1* | 5/2005 | Cox et al. ..................... 235/375 |
| 2005/0273668 | A1* | 12/2005 | Manning ....................... 714/39 |
| 2008/0127039 | A1* | 5/2008 | Simpson ..................... 717/100 |

FOREIGN PATENT DOCUMENTS

| WO | WO 00/77631 A1 | 12/2000 |
| WO | WO 0077631 | 12/2000 |
| WO | WO 0077632 | 12/2000 |

OTHER PUBLICATIONS

Preliminary Search Report prepared by the European Patent Office for the corresponding French Application No. 05 00764 filed Jan. 25, 2005 (3 pgs).
"Java Dynamic Management kit 5.1 Tutorial" prepared by Sun Microsystems, Inc., Jun. 2004 XP-002334093 (76 pgs).
Gamma, et al. Design Patterns: prepared by Design Patterns, Sep. 1999, XP-2334049 (40 pgs).

* cited by examiner

*Primary Examiner*—Moustafa M Meky
(74) *Attorney, Agent, or Firm*—Drinker Biddle & Reath LLP

(57) ABSTRACT

A method of administration in a JMX environment of software systems to be administered, represented by first respective MBeans, and at least one administration application, in which the administration acts produce the exposure of MBeans in at least one MBeanServer server, characterized in that it is implemented by means of a mediation device and that it comprises the following steps:

a tree structure of administration components representing first MBeans, in which each component is identified by a unique name, is constructed following the receipt of the name of an administration component, the mediation device dispatches a determined command to the administration component thus identified which, if it represents an MBean, exposes in the MBeanServer this Mbean;

when the administration component possesses descendent administration components in the hierarchical structure, the mediation device propagates the command to the descendents.

8 Claims, 5 Drawing Sheets

METHOD AND SYSTEM OF ADMINISTRATION IN A JMX ENVIRONMENT COMPRISING AN ADMINISTRATION APPLICATION AND SOFTWARE SYSTEMS TO BE ADMINISTERED

RELATED APPLICATIONS

The subject application claims the priority of French application No.: 05 00764, filed on Jan. 25, 2005.

FIELD OF INVENTION

The present invention lies in the field of the administration (management) of software systems. It relates more particularly to the administration of complex platforms typically corresponding to the integration of several software systems comprising various resources and distributed over a network, and developed separately and hence in a non-concerted manner with a view to their administration.

BACKGROUND OF THE INVENTION

The JMX standard is used to administer software systems tailored by means of the Java programming language. With Java programs becoming executable on all types of equipment, from mobile telephones and other onboard equipment to network infrastructures and application servers in the J2EE platform (Java 2 Enterprise Edition), JMX is increasingly often replacing the SNMP ("Simple Network Management Protocol") administration standard.

The JMX standard defines an architecture, services and an applications programming interface (API) for administering the resources of software systems. It has given rise to several implementations. The JMX standard is currently defined by the Java Specification Request 03 specification (cf. the Internet site http://java.sun.com/products/JavaManagement/).

In JMX, a resource to be administered is never accessed directly. It is administered by way of a particular Java software object dubbed an MBean (Management Bean), which "represents" this resource.

It is recalled that a software object is associated with attributes and operations. It constitutes an abstraction of a resource, for example an item of equipment, a component or a service.

An MBean is a software object associated with attributes and operations making it possible to administer said resource; within the framework of the present invention, these attributes and administration operations will be called "configuration elements". The choice of the particular configuration elements that one wishes to associate with a resource is called the "instrumentation" of said resource.

An MBean may be registered (it is also said to be "exposed") in an administration server, dubbed an MBeanServer, under a name making it possible to identify it. Such an MBeanServer provides a standard access means for performing administration acts on a resource represented by an MBean which it exposes. Specifically, exposure affords access to the attributes and to the administration operations associated with such an MBean.

This concept of MBean is for example defined in documents EP 909 057 and WO 00/77631.

JMX standardizes several services which are also represented by MBeans. Particular MBeans such as these are for example monitoring elements, which issue a notification as soon as they observe that an attribute of a resource is reaching a certain state.

JMX also standardizes the means of accessing an MBeanServer through connectors or adapters (Java Specification Request 160, JMX remote). It is thus possible to administer a system from a browser, via the HTTP protocol ("HyperText Transfer Protocol"), a remote Java client, via the remote invocation Java mechanism RMI ("Remote Method Invocation") or else to change information and protocol model by interconnecting with other administration standards such as SNMP or WEBM/CIM.

JMX can be used to administer a Java application in an ad hoc or standardized manner.

In the ad hoc case, the information exposed to the administrators, the convention for designing the MBeans representing this information, their shareout across one or more MBeanServers and the connectors enabling access thereto are chosen freely.

In the standardized case, these choices are enframed within a standard. A typical case being the administration model defined for the J2EE platform (Java Specification Request 77), based on JMX, and the objective of which is to harmonize the administration services rendered by various application servers (e.g. Websphere from IBM or Weblogic from BEA). This model describes in particular the information exposed to the administrators, such as the generic J2EE concepts (J2EEServer, J2EEResources, EJB, etc.), and standardizes access to this information via a particular component, dubbed Management EJB (MEJB).

Some functionalities, not provided originally by the JMX API and its reference implementation, have given rise to extensions. Mention may in particular be made of the dynamic creation of proxyMBean proposed by products known in the field namely JDMK (Sun MicroSystem) or MX4J (cf.mx4j.sourceforge.net). This functionality makes it possible to cascade MBeanServers by exposing, in an MBeanServer, a proxyMBean representing an MBean exposed in another MBeanServer. Document WO0077632 may also be cited, which describes how to dynamically process Java objects, by introspection, so as to render them manipulable in the form of MBeans.

The JMX specification essentially details the administration of server side software systems. Client side, it standardizes only the access to the information exposed by these systems through MBeanServers or through connectors/adapters/MEJB in the case of distributed access.

To utilize this information, the client, that is to say the administration application, must perform various manipulations such as select the relevant information or subscribe to notification services signaling particular events (alarms, etc.). In certain cases, it must manage the addition of services not envisaged on the server side, such as monitoring (surveillance) of a particular attribute. He must also manage several connections if the information that he wishes to utilize is shared out among several systems. The ad hoc developments which result therefrom are specific to the client's requirement and depend on server side changes, like the names used to identify the information or the parameterization of the connections allowing access thereto. Certain administration consoles make it possible to automate these manipulations by static configuration, but do not permit dynamic reconfiguration.

OBJECTS OF THE INVENTION

A difficulty encountered within the framework of JMX administration relates to the possibility of federating the administration of target systems by offering unique access making it possible to aggregate the administration information originating from several target systems, so as to successfully accomplish administration actions on these systems in a homogeneous manner.

Another difficulty encountered relates to the flexibility of such federated administration, which must make it possible to dynamically adapt to the changeability of the target systems and to alter the logical view of administration on these systems as a function of requirements.

The invention aims to solve these difficulties.

SUMMARY OF THE INVENTION

For this purpose, according to a first aspect, the invention proposes a method of administration in a JMX environment comprising a plurality of software systems to be administered, represented by first respective MBeans, and at least one administration application, in which the administration acts produce the exposure of MBeans in at least one MBeanServer server.

The administration method is characterized in that it is implemented by means of a mediation device and that it comprises the following steps:
  hierarchical structure of administration component representing MBeans from among which there figure first MBeans and in which each administration component is identified by a unique name is constructed in the mediation device;
  following at least the receipt of the name of and administration component of the hierarchical structure, provided by the administration application, the mediation device dispatches a determined command to the administration component identified by said name;
  following the receipt of the determined command, the administration component, if it represents at least one MBean, exposes in the MBeanServer at least said MBean; and
  when said administration component possesses descendent administration components in the hierarchical structure, the mediation device propagates said command to said descendents.

An administration component is a Java software object which can be manipulated in a development environment, so as to construct a hierarchical structure in combination with other administration components. In this hierarchical structure, at least one first administration component is a component of node type, that is to say that at least one second administration component of lower hierarchical rank may be tied to it by a subordination link. This second component is a direct descendent (or child) of the first component. A third administration component which is a direct descendent of the second component is also a descendent of the first administration component (grandchild). More generally, if an administration component X is a descendent of an administration component Y and if this administration component Y is itself a descendent of an administration component Z, then the component X is a descendent of the component Z. The invention thus allows an administration application to have, simply by providing the name of an administration component, access to a set of resources administered by the MBeans represented by on the one hand the named administration component and on the other all the administration components which descend therefrom (children, grandchildren, etc.).

The invention furthermore allows a logical view of administration which meets the requirements of the administrator, as defined by the administration component in a higher hierarchical position.

It affords access via a single interface and via the provision of a single name, to a set of administration information originating from independent software systems.

The invention furthermore makes it possible to add services relating to the administration of the software systems, by creating administration components which represent such services.

In an advantageous mode of implementation, the administration components are themselves MBeans. The hierarchical structure is defined as a function at least of configuration elements able to be exposed of these MBeans. This provision makes it possible to administer at one and the same time software systems and the mediation device in accordance with the JMX standard.

It furthermore allows a mode of management of the mediation device which is very flexible. The logical view that the administrators have with regard to the resources to be administered is thus modifiable, following the exposure of the administration components themselves in the MBeanServer.

In an embodiment of the invention, following the receipt by the mediation device of at least one request originating from the administration application, the mediation device implements management steps in which:
the administration components are exposed in an MBeanServer server; and
at least one operation is performed from among the modification of an administration component, the addition or the removal of an administration component to or from the hierarchical structure, said addition or said removal being executed on the administration component which is the parent of said added or removed administration component.

Thus, the administration of the mediation device and/or the modification of the hierarchical structure defining the logical view provided to the administrator (for example the creation of a new service) may readily be effected.

In an advantageous embodiment, the name of an administration component is dependent on the associated path in the hierarchical structure, thereby making it possible to obtain unambiguous designations and allowing ready use of the mediation device by several administration applications, this independently of the modifications performed on the software systems, for example modifications performed on MBeans representing these systems (first MBeans).

According to a second aspect, the invention proposes an administration system in a
  JMX environment comprising a plurality of software systems to be administered, represented by first respective MBeans, and at least one administration application, in which the administration acts produce the exposure of MBeans in at least one MBeanServer server.

The administration system according to the invention is characterized in that it furthermore comprises a mediation device comprising:
  means of construction of a hierarchical structure of administration components representing MBeans from among which there figure first MBeans and in which each administration component is identified by a unique name;

means for, following the receipt of the name of an administration component of the hierarchical structure, provided by the administration application, dispatching a determined command to the administration component identified by said name;

means such that, when an administration component receives said determined command, if it represents at least one MBean, it exposes in the MBeanServer at least said MBean; and means for, when an administration component having received said determined command possesses descendents in the hierarchical structure, propagating said command to said descendents.

BRIEF DESCRIPTION OF THE DRAWINGS

Other features and advantages of the present invention will become apparent in the description hereinbelow of nonlimiting exemplary embodiments, with reference to the appended drawings, in which.

DETAILED DESCRIPTION

Figure 1:
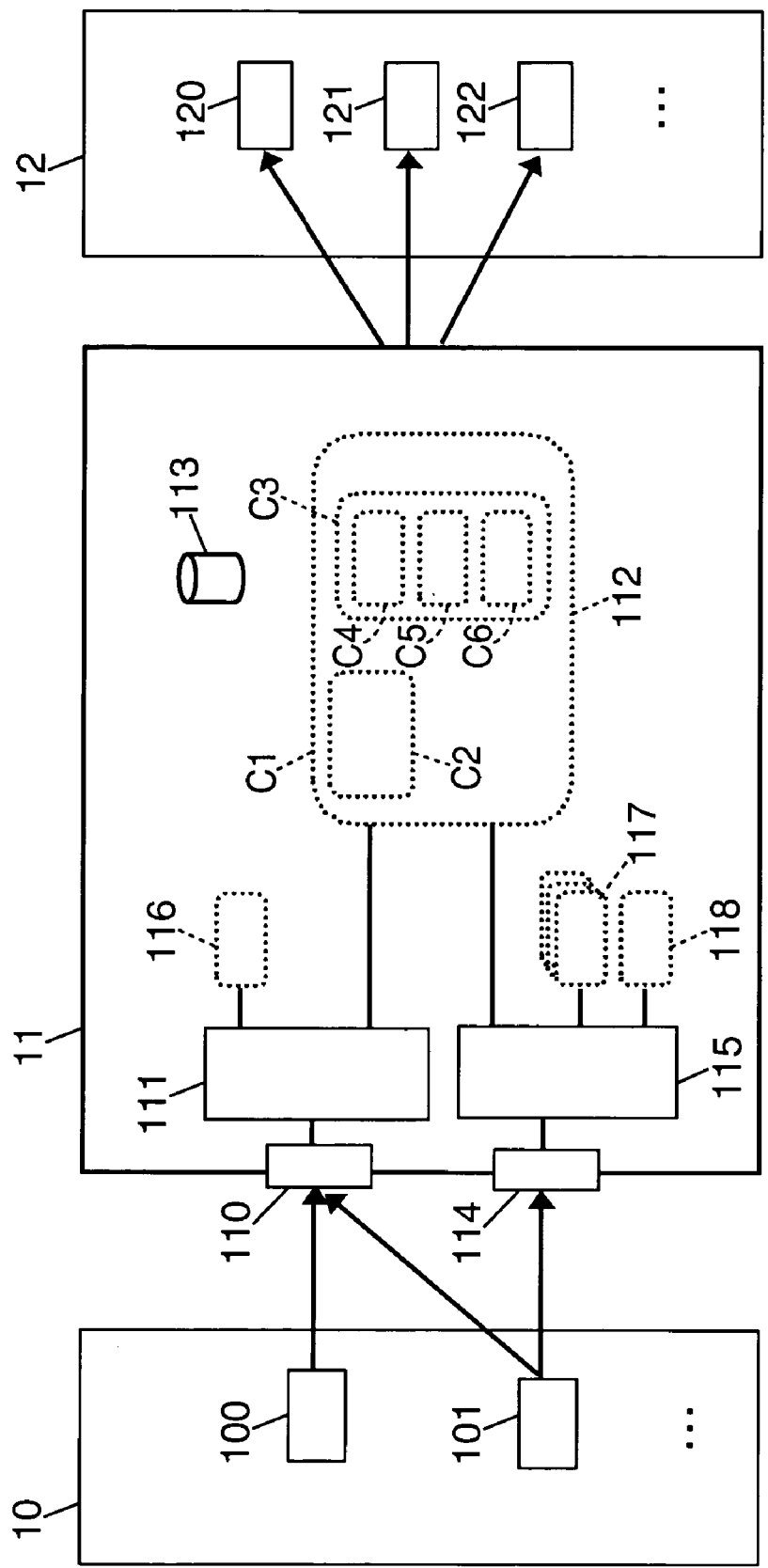
FIG. 1 represents a mediation device in an embodiment of the invention.

FIG. 1 represents a set 12 of software systems to be administered. Three of these software systems are represented in FIG. 1, bearing the references 120, 121 and 122.

These systems are administered, and in particular instrumented, with the JMX standard independently. The software system 120 is for example a Java application represented by an MBean M0 locally exposing information from an MBeanServer furnished with an RMI connector. The system 121 is for example an application hosted by a J2EE application server (for example Websphere from IBM or Weblogic from BEA) and represented locally by an MBean M1 exposing information from an MEJB (Management Enterprise Java Bean). The software system 122 is for example a Java application represented by an MBean M2 locally exposing information from an MBeanServer furnished with an RMI connector. In what follows only one MBean is considered per software system, but the invention applies equally in the presence of several MBeans per software system.

Represented in FIG. 1 is a set 10 of administration applications capable of interfacing with standard JMX connectors/adapters. Each of these administration applications is intended to administer several software systems 12. Two of these administration applications 100, 101 are represented. They may be a browser using an HTTP adapter, a Java client using an RMI connector or else an SNMP manager (of HP OpenView or IBM Tivoli type) using an SNMP adapter.

According to the invention, disposed between the set of administration applications 10 and the set of software systems to be administered 12 is a mediation device 11. This device 11 comprises in the embodiment considered here two standard connectors/adapters 110 and 114.

The mediation device 11 furthermore comprises two MBeanServers administration servers 111 and 115.

The mediation device 11 furthermore comprises a workshop 117 comprising factories for creating administration components. Each factory makes it possible to create administration components of a given type, and to parameterize them. Each type is associated with a particular administration function, such as creating proxy MBeans on remote MBeans, adding services to measure (e.g. a monitor in charge of the surveillance of an attribute of a particular resource) or else dynamically deploying local resources. It is possible to introduce a new type of administration component into the mediation device 11 by adding the appropriate factory to the workshop 117.

Figure 2:
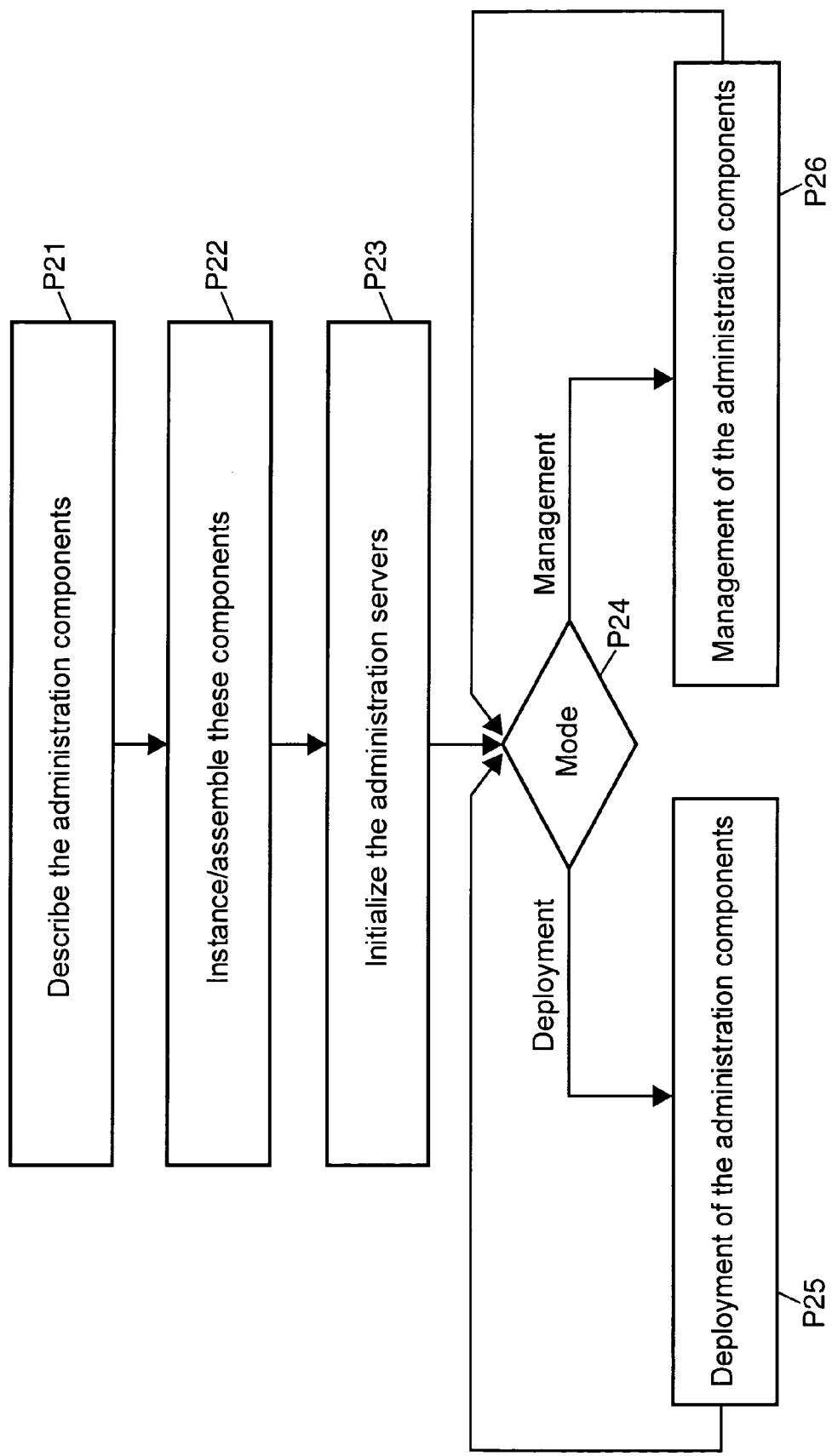
FIG. 2 describes various steps of a method implementing the invention.

FIG. 2 indicates the various steps implemented in an embodiment of the invention, in the mediation device 11. These steps correspond firstly to a mode of initialization, then to a mode of deployment and finally to a mode of management of the mediation device 11.

Initialization Mode:

In a step P21, a hierarchical logical view of administration functions relating to the software systems of the set of software systems 12 is defined.

This logical view is thereafter translated into a persistent representation 113 of an organization of administration components according to a hierarchical structure reflecting said view.

This persistent representation makes it possible to initialize the mediation device 11. It may be produced manually or with the aid of the device 11 itself, as described hereinbelow and is stored in a memory of the mediation device 11.

In the proposed embodiment, this persistent representation 113 is an XML file (eXtended Markup Language) describing the organization of the administration components according to the hierarchical structure. The nodes of this hierarchy are named in such a way as to form a nonambiguous designation space (a node cannot have two child nodes bearing the same name). In a leaf of this hierarchy are included the data necessary for the establishment of the technical chain allowing the exposure of information representing, depending on the case, proxies on information already exposed by a software system of the set 12 of software systems, an administration service added by the mediation device 11 or any other information.

Figure 5:
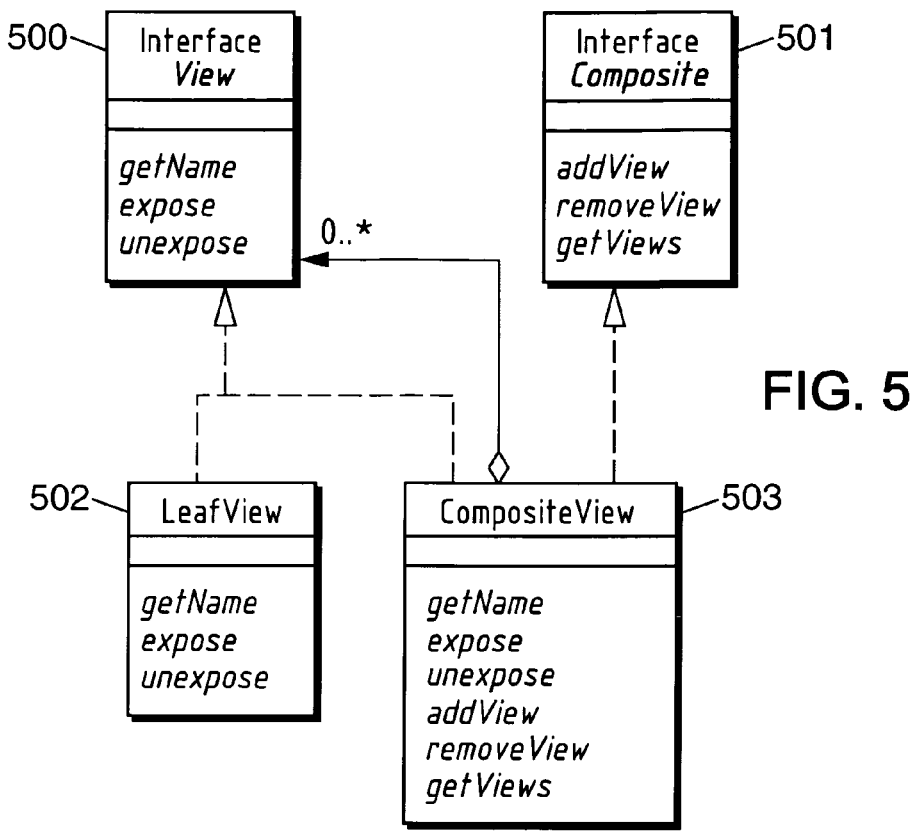
FIG. 5 is a UML (Unified Modeling Language) diagram representing the make-up of a composite administration component in an embodiment of the invention.

Step P22 consists in traversing the persistent representation 113 produced during step P21, to create an assemblage of administration components reflecting the hierarchical structure described in this representation. The design template used to create and assemble these components is illustrated in FIG. 5, and draws its inspiration from libraries making it possible to build up graphical objects (for example the API swing from Java). In the present case, any administration component is an MBean which implements the View 500 job interface, the respective role of whose two operations "expose" and "unexpose" is to expose in an MBeanServer and to remove from an MBeanServer, the MBeans represented by this administration component.

Each leaf of the hierarchy leads to the creation, with the aid of a factory 117, of an administration component of LeafView type 502 specialized and parameterized with the data filled in during step P21 for this leaf.

Each node of the hierarchy—leaves excepted—leads to the creation of a component of CompositeView type 503 implementing the View 500 and Composite 501 interfaces. This second interface makes it possible to add components of View type 500 to the component created (or to remove them therefrom). An administration component (the parent component) which has a direct descendent (child component) according to the hierarchical structure, is thus an administration component defined as component containing the child component.

It is thus possible to organize the administration components according to the hierarchical structure produced during step P21 and to call the operations "expose" and "unexpose" in a uniform manner on any component. In the case of an administration component of composite type, that is to say a node or a parent component, these operations are propagated to the administration component(s) which it contains (child component(s)). A valid parent composite verifies, during the addition of a new child component, that the name of the latter is not already used by a child component already contained in the parent component.

The step P23 consists in instancing the MBeanServers servers 111 and 115 and in exposing therein the JMX connectors/adapters 110 and 114 allowing an administration application of the set of applications 10 to access the device 11 according to two respective modes.

The deployment mode is initialized by exposing in the MBeanServer 11 a particular administration component 116, described hereinbelow, making it possible to monitor the information exposed.

The management mode is initialized by exposing in the MBeanServer 115 the particular administration components 117 and 118 described hereinbelow, making it possible to monitor the actions of reconfiguration of the mediation device 11.

Steps P24, P25 and P26 represent the use of the mediation device 11 by an administration application. This administration application can use the device exclusively in deployment mode or exclusively in management mode, or can use either alternately. In the embodiment represented in FIG. 1, the client application 100 accesses the device 11 in deployment mode only. The client application 101 accesses the device in deployment and management modes.

Figure 3:
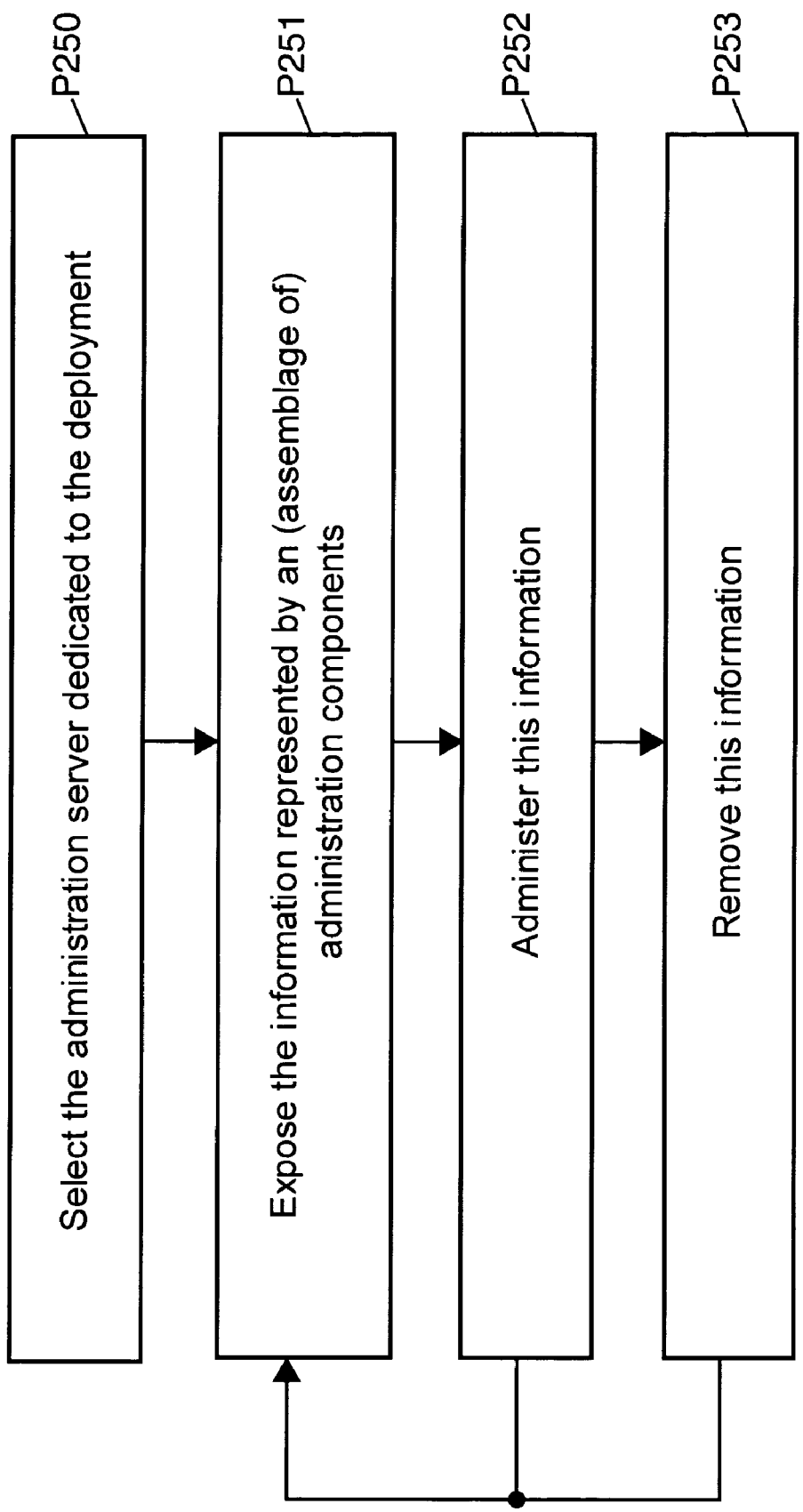
FIG. 3 details the deployment steps represented in FIG. 2 in an embodiment of the invention.
Figure 4:
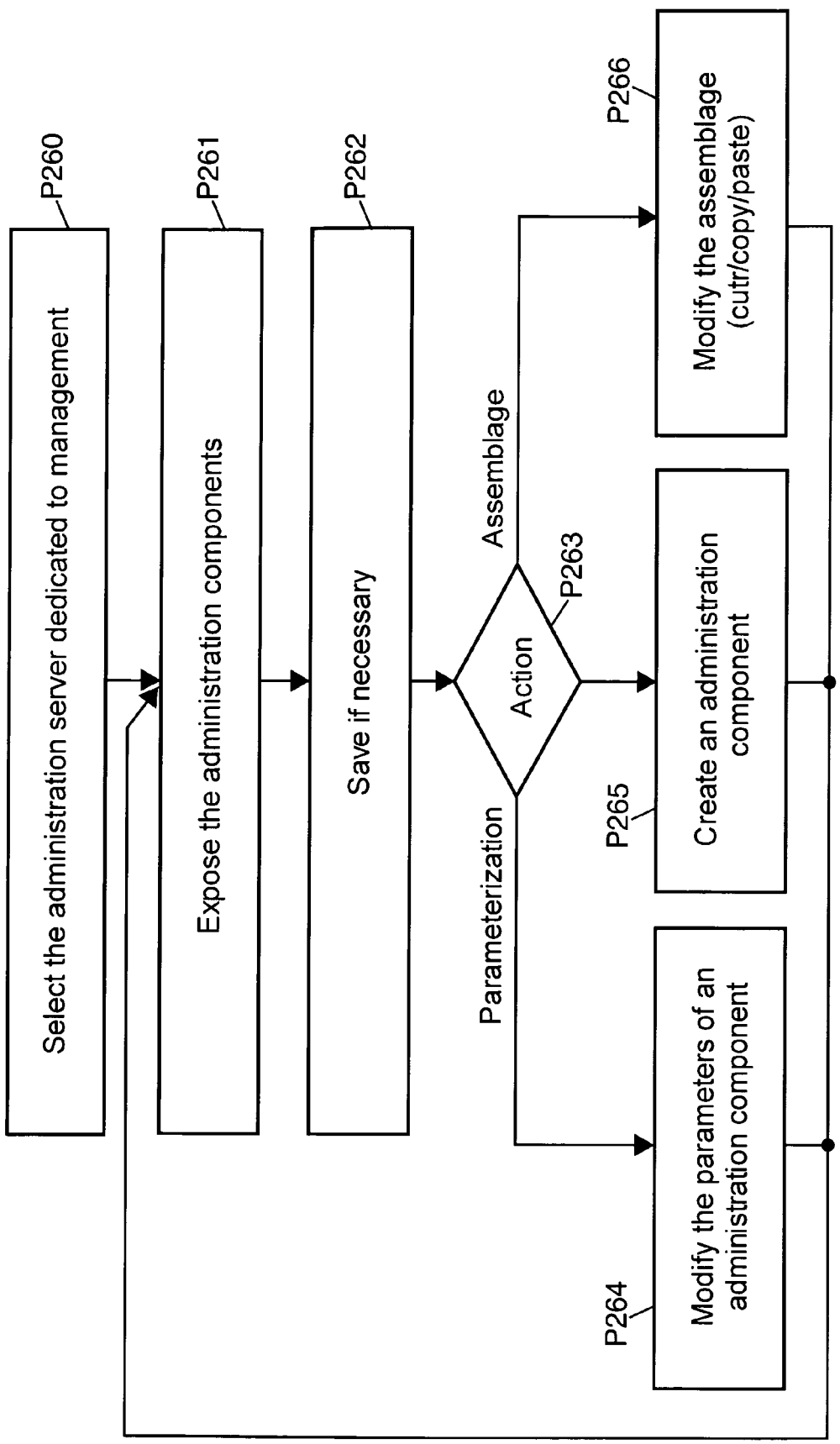
FIG. 4 details the management steps represented in FIG. 2 in an embodiment of the invention.

The steps of the deployment and management modes are illustrated in greater detail respectively in FIGS. 3 and 4.

Deployment Mode:

The method used to implement the device 11 in deployment mode is illustrated by FIG. 3.

Step P250 consists, in respect of an administration application of the set of applications 10, in accessing the device via the connector/adapter 110, thereby causing the selection of the MBeanServer 111 intended for deployment.

Step P251 consists in exposing in the MBeanServer 111 the information represented by an administration component, by traversing the assemblage of components that it contains if the latter is composite. To carry out this step, the administration application, for example the administration application 101, uses the component 116 exposed in the MBeanServer 111 during step P23. This component 116 provides an operation making it possible to trigger the exposure of the MBeans represented by an administration component. This operation takes as argument the absolute name of this administration component, provided by the administration application 101, and making it possible to locate it in the global assemblage 112.

If this administration component is composite, it propagates the exposure command to the administration components that it contains, which themselves propagate it if they are composite etc. Each administration component encountered during this propagation exposes in the MBeanServer 111 the MBeans that it represents, using a designation convention specific to each type of administration component. For example, in the case of proxy MBeans representing remote MBeans, the name of a proxy may be identical to the name of the remote MBean that it represents.

For example, with reference to FIG. 1, when the name given as argument by the administration application 101 is the name of the administration component C1 represented in FIG. 1, the exposure command will be transmitted in fact to the hierarchical assemblage 112 consisting of the parent component C1, of the child components C2, C3 of the component C1 of the components, then to the child components C4, C5, C6 of the administration component C3. The component C4 is for example a leaf component representing the MBean M0 initially exposed in the software system 120. It is therefore configured with the address of this system and possibly with a filter (so as not to repatriate everything). When it receives this exposure command, it will then expose in the MBeanServer 111 a proxy MBean on the MBean M0 of the software system 120.

Step P252 represents the phase of administration by the administration application 110 of the information then exposed in the MBeanServer 111.

On completion of this step, it is possible to expose new information (step P251) or to remove it (step P253) from the MBeanServer 111, by the triggering by the administration application 110 of a new operation on this component 116.

Step P253 consists in removing information represented by an administration component 112, by traversing the assemblage of components that it contains if the latter is composite. The method is symmetric with that used by step P251 using an operation of the component 116 which is dedicated to this effect. The designation convention used during step P251, to expose MBeans in the MBeanServer 111, is now used to retrieve these MBeans and to remove them.

The mediation device 11 guarantees that the global hierarchical assemblage of the administration components forms a nonambiguous designation space. Specifically, there exists a unique path leading from the root of this hierarchy to a component. This path represents the absolute name of the component which may be used by the administration application to identify the administration components that it wishes to use.

Management Mode:

The method used to implement the mediation device 11 in management mode is illustrated by FIG. 4.

In a step P260, the administration application 101 accesses the mediation device 11 via the connector/adapter 114, thereby causing the selection of the MBeanServer 115 intended for exposure in management mode and the switching of the mediation device 11 into management mode.

Step P261 then consists in exposing in the MBeanServer 115 the current configuration of the administration components themselves of the hierarchical structure. Each component thus exposes its configuration elements, such as a threshold in the case of a component representing a monitor, a filter (pattern on JMX ObjectNames) in the case of a component having to select MBeans, or any other parameter.

The exposure of this information is possible because the administration components are implemented, in the embodiment considered, in the form of MBeans. This exposure step is triggered by the administration application 101 with the aid of the component 118 (exposed in the MBeanServer 115 during step P23) which provides an operation dedicated to this effect, or else is triggered automatically by the mediation device 11 after steps P265 and 266 detailed hereinbelow modifying the structure of the assemblage of the administration components.

Step P262 consists in saving the current configuration of the administration components 112. This optional step may be triggered by the administration application 101 with the aid of the component 118 which provides an operation dedicated to this effect, producing a persistent representation of the current configuration similar to 113.

Step P263 represents a choice regarding the possible actions in management mode.

In an embodiment, in a step P264, the administration application 101 modifies the parameterization of an administration component exposed in the MBeanServer 115. This may involve modifying the value of a threshold in the case of a component representing a monitor, the value of a filter (pattern on JMX ObjectNames) in the case of a component having to select MBeans, or any other parameter value.

Advantageously, in a step P265, the administration application 101 creates a new administration component with the aid of a factory 117 exposed in the MBeanServer 115 during step P23. Each factory is dedicated to the creation of a component of a given type and provides one (or more) "create" operation(s) taking as argument the data making it possible to parameterize this component. For example, to create a component representing a JMX monitor, the arguments will pertain to the alarm threshold(s), the periodicity of observation, the name of the attribute to be observed, the name of the MBeans to be observed etc.

Each "create" operation of a factory also has an argument making it possible to place the new component immediately into the assemblage 112 of administration components. Advantageously, this argument represents a path through the hierarchical structure of the assemblage and makes it possible to site where to add the new component.

The implementation of this operation is based on the "composite" design template used to assemble the administration components, and illustrated in FIG. 5. In the case of an erroneous path or of a conflict with the names, the "create" operation fails.

In a mode of implementation of the invention, the administration application 101 carries out a step P266, which consists in modifying the current assemblage 112 of the administration components by a manipulation of "cut/copy/paste" type taking its inspiration from the graphics interface of office tools. In the present case, these manipulations are triggered by the administration application 101 with the aid of the component 118 which provides three similar operations, each taking an argument representing a path through the hierarchical structure of the assemblage of components. Just as for creation (step P265), the implementation of these operations is based on the "composite" design template used to assemble the administration components according to a hierarchical structure. The "cut" operation makes it possible to remove from the assemblage the component found by following the path given as argument, and to retain it in memory. The "copy" operation makes it possible to retain in memory the component found in the assemblage by following the path given as argument. The "paste" operation makes it possible to add to the assemblage the last component retained in memory, at the location found by following the path given as argument. In the case of an erroneous path or of a conflict in the names, these operations fail.

Any modification performed on the administration components, during steps P264, P265 and P266 may be tested immediately in the mode of deployment (P25) of the mediation device 11 or lead to a saving of the new configuration (step P262).

Thus, the invention, according to the deployment mode, makes it possible to administer several software systems 120, 121, 122 by exposing in the MBeanServer 111 the information represented by administration components.

Figure 6:
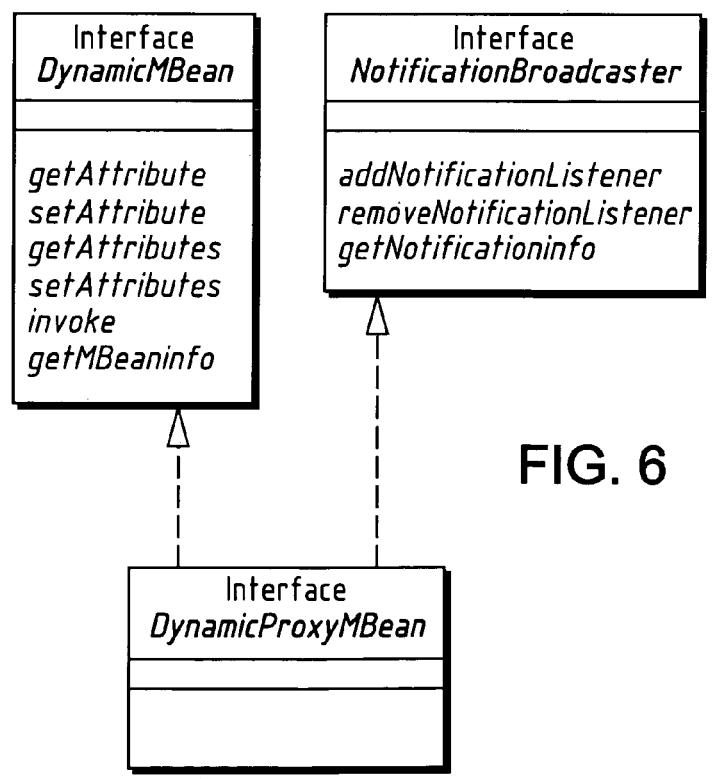
FIG. 6 is a UML diagram describing the interface of a proxy on a management object used by the method of the invention.

The invention makes it possible to create administration components corresponding to administration functions that are not provided for by the initial instrumentation of the software systems to be administered. For example, a (composite) administration component may represent a service not provided for by a J2EE application (e.g. the software system 121), such as the monitoring of an attribute of a particular resource. To add this service to the mediation device 11, it is possible to assemble, within a composite administration component, an administration component representing a proxy on the remote resource and an administration component representing a JMX controller parameterized with the alert thresholds, the names of the attribute and of the proxy to be monitored. The elementary components used by this assemblage are simple. A monitor is a basic function of JMX which it suffices to parameterize with the aid of an administration component in charge of exposing it in the MBeanServer 111. A resource exposed via an MEJB, may be represented in the MBeanServer 111 by a proxy MBean implementing the "DynamicMBean" and "NotificationBroadcaster" interfaces of the API JMX (cf. FIG. 6). The implementation delegates each of the operations of these two interfaces to an MEJB built during the construction of the proxy. The administration component in charge of exposing this proxy therefore has the necessary parameters for creating the JNDI context making it possible to connect up to the MEJB and to identify the resource by its name. More complex examples of assemblage, such as the interrelating of MBeans exposed by independent software systems, may also be created with the aid of the mediation device 11.

The invention, according to the management mode makes it possible to dynamically reconfigure the device by exposing the administration components themselves in the MBeanServer 115. This mode is accessed by a client (e.g. 101) via the connector/adapter (114) and monitored by the particular components 117 and 118.

Access to these two modes is differentiated in the embodiment described so as not to mix up the information and to make it possible to associate an access policy as a function of the administration application.

The invention does not require that the MBeanServer used in deployment mode—(described previously via the MBean-Server 111)—be distinguished from that used in management mode—(described previously via the MBeanServer 115). In a particular embodiment, access to each of these two modes may be afforded by one and the same MBeanServer.

The invention does not apply only to a distributed context. In a particular embodiment, the administration application 100 or 101 can reside in the same Java virtual machine as the mediation device 11 and access the MBeanServers 111 or 115 directly via local Java references. Likewise, an administration component of the hierarchical assemblage of components can represent information on a local Java application (residing in the same Java virtual machine as the device 11) and instrumented in a conventional manner with JMX or dynamically by this component (for example as described by patent WO0077632).

The invention does not impose any purpose on the software systems to be administered 12 or on the administration applications 10. The only presupposition is that they conform to the JMX administration standard. In a particular embodiment, at least one software system to be administered (for example 122) or at least one administration application (for example 101) may be a mediation device similar to 11.

The invention does not impose any global designation convention in respect of the MBeans exposed by the device 11. In a particular embodiment, each administration component can add its own name (for example in the form of a prefix or a property) to the name of the MBeans that it represents in the hierarchical structure of components 112. This information, which is different for every leaf component, makes it possible to avoid clashes of name with MBeans exposed by other leaf components.

Thus, the invention proposes a device and a method for mediation for administering software systems instrumented with JMX—including the mediation device itself constructed with the aid of an assemblage of MBeans. The invention avoids any dependence on the connections used server side and requires no ad hoc development to aggregate the relevant information or to add administration services that are not provided for by the target systems. The device is reconfigurable, in that it makes it possible to dynamically change the logical view that an administrator has of the systems which he is administering (by reconfiguring the hierarchical assemblage of administration components) and these reconfiguration functions are accessible from outside the device by the same JMX access mode (and not an ad hoc access mode) as the mode of access to the target systems administered.

What is claimed is:

1. A method of administration in a JMX environment comprising a plurality of software systems to be administered, represented by first respective MBeans, and at least one administration application, in which the administration acts produce the exposure of MBeans in at least one MBeanServer server, the method being implemented by a mediation device and comprising:

a hierarchical structure of administration components, representing MBeans from among which there figure first MBeans and in which each administration component is identified by a unique name, is constructed in said mediation device;

following at least the receipt of the name of an administration component of said hierarchical structure, provided by said administration application, the mediation device dispatches a determined command to the administration component identified by said name;

following the receipt of said determined command, the administration component, if said determined command represents at least one MBean, exposes in said MBeanServer at least said MBean; and when said administration component possesses descendent administration components in the hierarchical structure, the mediation device propagates said command to said descendents.

2. The method of claim 1, wherein the administration components include one or more MBeans, and the hierarchical structure is defined as a function at least of configuration elements able to be exposed of said MBeans.

3. The method of claim 2, wherein following the receipt of at least one request originating from said administration application, the mediation device implements the method further comprising:

the administration components are exposed in an MBeanServer server; and at least one operation is performed from among: the modification of an administration component, the addition of an administration component to the hierarchical structure, or the removal of an administration component from the hierarchical structure, said addition or said removal being executed on the administration component that is the parent of said added or removed administration component.

4. The method of claim 3, wherein the name of an administration component is dependent on the associated path in said hierarchical structure.

5. A computer program product comprising a plurality of instructions stored on a computer readable medium that, when executed by a processor, cause the processor to perform the operations of claim 1.

6. An administration system including a mediation device in a JMX environment comprising a plurality of software systems to be administered, represented by first respective MBeans, and at least one administration application, in which the administration acts produce the exposure of MBeans in at least one MBeanServer server, the system comprising:

means of construction of a hierarchical structure of administration components representing MBeans from among which there figure first MBeans and in which each administration component is identified by a unique name;

means for, following at least the receipt of the name of an administration component of the hierarchical structure provided by said administration application, dispatching a determined command to the administration component identified by said name;

means such that, when an administration component receives said determined command, if said determined command represents at least one MBean, said determined command exposes in the MBeanServer at least said MBean; and means for, when an administration component having received said determined command possesses descendents in the hierarchical structure, propagating said command to said descendents.

7. The system of claim 6, wherein the administration components include one or more MBeans, and the hierarchical structure is defined as a function at least of configuration parameters able to be exposed of said MBeans.

8. The system of claim 7, wherein at least one request originating from said administration application is received by said mediation device, the system further comprising managing means configured for:

exposing administration components in a MBeanServer server; and performing at least one operation from among: the modification of an administration component, the addition of an administration component to the hierarchical structure, or the removal of an administration component from the hierarchical structure, said addition or said removal being executed on the administration component which is the parent of said added or removed administration component.

* * * * *